(12) United States Patent
Adamczyk et al.

(10) Patent No.: US 9,271,445 B2
(45) Date of Patent: Mar. 1, 2016

(54) STALKED CROP HARVESTING HEADER AND METHOD FOR HARVESTING STALKED CROP MATERIAL

(75) Inventors: Dariusz Adamczyk, Plock (PL); Stanislaw Kudla, Plock (PL)

(73) Assignee: CNH Industries America LLC, New Holland, PA (US)

( * ) Notice: Subject to any disclaimer, the term of this patent is extended or adjusted under 35 U.S.C. 154(b) by 140 days.

(21) Appl. No.: 13/996,835

(22) PCT Filed: Dec. 19, 2011

(86) PCT No.: PCT/EP2011/073240
§ 371 (c)(1),
(2), (4) Date: Jun. 21, 2013

(87) PCT Pub. No.: WO2012/084825
PCT Pub. Date: Jun. 28, 2012

(65) Prior Publication Data
US 2013/0283749 A1  Oct. 31, 2013

(30) Foreign Application Priority Data
Dec. 22, 2010 (BE) ............... BE2010/0752

(51) Int. Cl.
  *B65G 23/44* (2006.01)
  *A01D 47/00* (2006.01)
  *A01D 45/02* (2006.01)
  *F16H 7/12* (2006.01)
  *F16H 7/08* (2006.01)

(52) U.S. Cl.
  CPC .............. *A01D 47/00* (2013.01); *A01D 45/023* (2013.01); *B65G 23/44* (2013.01); *F16H 7/1281* (2013.01); *F16H 2007/0893* (2013.01)

(58) Field of Classification Search
  CPC ........... B65G 37/00; B65G 23/44; F16H 7/14
  USPC .................................................. 198/813, 814
  See application file for complete search history.

(56) References Cited

U.S. PATENT DOCUMENTS

| 2,355,100 | A | * | 8/1944 | Nordquist ................. 198/481.1 |
| 4,244,162 | A |   | 1/1981 | Pucher |
| 4,253,343 | A | * | 3/1981 | Black et al. ................. 474/135 |
| 4,598,535 | A |   | 7/1986 | Sousek |
| 6,237,314 | B1 |  | 5/2001 | Boll |
| 6,802,414 | B2 |  | 10/2004 | Buhne |

FOREIGN PATENT DOCUMENTS

DE   102004061112 A1   6/2006
FR      2529749 A1   1/1984

* cited by examiner

*Primary Examiner* — Gene Crawford
*Assistant Examiner* — Lester Rushin
(74) *Attorney, Agent, or Firm* — Patricia M. Sheldrake

(57) ABSTRACT

A tensioning system for maintaining the tension in a chain conveyor extended over at least one drive sprocket and one idler sprocket, and a method for maintaining the tension in a chain conveyor, in particular for example for a stalked crop harvesting header. The tensioning system comprises a first tensioning arm and a second tensioning arm rotatably connected to one another for rotation around a shaft onto which one of the sprockets is mounted, the second tensioning arm rotatably connected to a fixed point of a supporting plate, wherein the tension in the chain conveyor is maintained by rotational movement of at least one of the drive sprocket or the idler sprocket around a fixed point of the supporting plate.

16 Claims, 5 Drawing Sheets

STALKED CROP HARVESTING HEADER AND METHOD FOR HARVESTING STALKED CROP MATERIAL

This application is the US National Stage filing of International Application Serial No. PCT/EP2011/073240 filed on Dec. 19, 2011, which claims priority to Belgium Application BE2010/0752 filed Dec. 22, 2010, which is incorporated herein by reference in its entirety.

TECHNICAL FIELD

This invention generally relates to row stalked crop harvesting machinery, and, more particularly, to a stalked crop harvesting header and a method for harvesting stalked crop material, for example sunflower or corn, in particular for example corn ears and grain. In particular, the present invention relates to a tensioning system for adjusting the tension of a chain conveyor and a method for maintaining the tension in a chain conveyor of such harvesting machinery.

BACKGROUND ART

A row crop harvesting machine such as a corn harvesting machine described for example in U.S. Pat. No. 6,237,314, U.S. Pat. No. 4,244,162 and DE 10 2004 061 112 has a header displaceable along the ground which comprises a plurality of grooves each adapted to receive a row of corn stalks during operation of the harvester. A conveyor chain, having its longitudinal axis parallel to the grooves of the header and spanned over a drive sprocket and an idler sprocket, is generally provided at each of the grooves to convey the harvested material, such as corn ears or grain, towards a central gathering point in the corn harvester.

In the known corn harvesting headers, tension in the conveyor chains is maintained by changing the axial distance between the drive sprocket and the idler sprocket by means of a spring system, which pushes the idler sprocket away from the drive sprocket when the tension in the conveyor chain is too low, and pulls the idler sprocket towards the drive sprocket when the tension in the chain is too high. The idler sprocket is thereby guided in a direction parallel to the grooves of the corn harvesting header, using linear guidance elements which obstruct movement of the idler sprockets in the cross direction. In U.S. Pat. No. 6,237,314 and in DE 10 2004 061 112, for example, the idler sprocket is connected to the spring system by means of a connecting arm which slides through a recess, wherein the recess supports the linear movement of the idler sprocket in a direction away from or towards the drive sprocket.

The use of linear guidance elements, however, has several disadvantages, since during operation of the corn harvester dirt and corn waste can become jammed between the guidance elements, thereby blocking the functioning of the chain tensioner. Moreover, the guidance elements are difficult to maintain and are prone to blocking due to rust formation during periods of inactivity of the corn harvester.

DISCLOSURE OF INVENTION

It is an object of embodiments of the present invention to provide a stalked crop harvesting header, e.g. a corn harvesting header, with a good chain tensioning mechanism. A chain tensioning mechanism according to embodiments of the present invention is easy to maintain. A chain tensioning mechanism according to embodiments of the present invention is, less than prior art systems, prone to blocking due to rust formation during periods of inactivity of the stalked crop harvester, e.g. corn harvester. It is an advantage of a stalked crop harvesting header, e.g. a corn harvesting header, according to embodiments of the present invention that stalked crop material can be harvested substantially without blockage of the harvesting header.

The above objective is accomplished by a method and device according to embodiments of the present invention.

In one aspect, the present invention provides a stalked crop harvesting header for being attached to a stalked crop harvester. The stalked crop harvesting header comprises a conveyor system with a chain for conveying harvested stalked crop material, the chain being driven around two sprockets. The stalked crop harvesting header furthermore comprises a tensioning system for tensioning the chain of the conveyor system. The tensioning system comprises a spring system coupled to a first tensioning arm, the spring system being arranged for applying a force on the first tensioning arm. The first tensioning arm and a second tensioning arm are rotatably connected to one another around a shaft on which one of the sprockets is mounted. The second tensioning arm is rotatably connected to a fixed point on a frame of the harvesting header. It is an advantage of a stalked crop harvesting header according to embodiments of the present invention that no or only limited jamming of the tensioning system takes place due to dirt or crop waste being stuck in the tensioning system. Furthermore, the tensioning system according to embodiments of the present invention is simple in construction and in operation.

A stalked crop harvesting header according to embodiments of the present invention may have the shaft provided on the first tensioning arm such that the second tensioning arm can rotate around it, or vice versa. The shaft is not provided fixed on a frame, so that the shaft can move with respect to the frame, so as to, at the same time, move one of the sprockets around which the conveyor chain is driven, thus changing the tension in the conveyor chain.

In a stalked crop harvesting header according to embodiments of the present invention, the angle between the first tensioning arm and the second tensioning arm may takes a value in a range between 80° and 100° during the tensioning process.

In a stalked crop harvesting header according to embodiments of the present invention, the second tensioning arm may be placed substantially perpendicularly to a central axis of the spring system. This allows the idler sprocket to move substantially linearly within the range of movement of the second arm.

A stalked crop harvesting header according to embodiments of the present invention may comprise a supporting plate having an upper surface, wherein the tensioning system is arranged in a plane parallel to the upper surface of the supporting plate such that a spacing is provided between the upper surface and the tensioning system. This allows to prevent friction between the tensioning system and the supporting plate.

In a stalked crop harvesting header according to embodiments of the present invention, the spring system may comprise a coil spring and a rod member, the rod member being connected to the first tensioning arm. A coil spring may easily be adapted to provide a reliable force onto the first tensioning arm.

In a particular embodiment, the first aspect of the present invention provides a stalked crop harvesting header suitable for being attached to a stalked crop harvester. The stalked crop harvesting header comprises a chain conveyor extending over at least one drive sprocket and at least one idler sprocket, for conveying harvested stalked crop material, and a tensioning system for tensioning the chain conveyer between the at least one drive sprocket and the at least one idler sprocket.

The tensioning system comprises a spring system, a first tensioning arm and a second tensioning arm. The spring system is arranged for applying a force on the first tensioning arm, the first tensioning arm lying in a longitudinal direction of the spring system and having a distal end with respect to the spring system. The second tensioning arm has a first extremity with a perpendicular axis passing through the distal end of the first tensioning arm (or alternatively the perpendicular axis is provided on the first tensioning arm) and a second extremity rotatably connected to a fixed point on a frame. The distal end of the first tensioning arm and the first extremity of the second tensioning arm in this embodiment are rotatably connected to one another. The tensioning system furthermore comprises means to assemble the idler sprocket onto the tensioning system, the idler sprocket being centered with respect to the axis through the distal end of the first tensioning arm.

In a second aspect, the present invention provides a method for harvesting stalked crop material with a stalked crop harvesting header. The method comprises the steps of moving a stalked crop harvesting header through a field of crop stalks for receiving crop stalks, conveying harvested crop stalks with a chain conveyor, the chain conveyor extending over at least two sprockets, such as for example at least one drive sprocket and at least one idler sprocket, maintaining the tension in the chain conveyor between the at least two sprockets with a tensioning system, wherein the step of maintaining the tension in the chain conveyor comprises adjusting the axle spacing between the two sprockets by changing the position of one of the sprockets by means of a rotational movement of the axis of that sprocket around a fixed point on the crop harvesting header.

In a further aspect, the present invention provides a tensioning system for adjusting the tension of a chain conveyor adapted for being driven around two sprockets. The tensioning system comprises a first tensioning arm and a second tensioning arm rotatably connected to one another for rotation around a shaft onto which one of the sprockets is mounted. The second tensioning arm is rotatably connected to a fixed point of a supporting plate. The tensioning system furthermore comprises a spring system arranged for applying a force on the first tensioning arm, thus onto the shaft onto which one of the sprockets is mounted, and hence on the conveyor chain. It is an advantage of a tensioning system according to embodiments of the present invention that the system is simple in construction and in operation. Furthermore, in a tensioning system according to embodiments of the present invention no or only limited jamming of the tensioning system takes place due to dirt being stuck in the tensioning system.

In a tensioning system according to embodiments of the present invention, the shaft may be mounted on the first tensioning arm allowing the second tensioning arm to rotate around it or vice versa. This shaft forms the axis of the sprocket mounted thereon. It is on this shaft, according to embodiments of the present invention, that a force is applied to maintain, increase or reduce the distance between the axes between two sprockets around which the conveyor chain is to be driven. By applying a force on the shaft, one of the sprockets may be moved, hence tensioning the chain conveyor or reducing the tension on the chain conveyor (depending on the direction of movement of the sprocket).

In accordance with embodiments of the present invention, the first tensioning arm may be lying in a longitudinal direction of the spring system. Hence the tensioning system only takes a limited space in transversal direction.

In accordance with embodiments of the present invention, the spring system comprises a coil spring and a rod member, the rod member being connected to the first tensioning arm. The coil spring may be covered by a cylindrical sleeve, thus preventing dirt from being jammed between turns of the spring.

In alternative embodiments, the spring system comprises a gas spring which inherently is less prone to dirt accumulation and which is simple in construction.

In accordance with embodiments of the present invention, the angle between the first tension arm and the second tensioning arm is between 70° and 110°, for example between 80° and 100°, e.g. between 85° and 95°, hence for example substantially 90°. By placing the first and second tensioning arm substantially perpendicular to one another, and by rotating the second tensioning arm around a fixed point on a frame onto which the tensioning system is attached, the movement of the first tensioning arm and hence of the spring system will be in a direction substantially in longitudinal direction of the spring system.

In yet another embodiment, the present invention provides the use of a tensioning system according to embodiments of the present invention for maintaining the tension in a conveyor chain of a stalked crop harvester.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Figure 1:
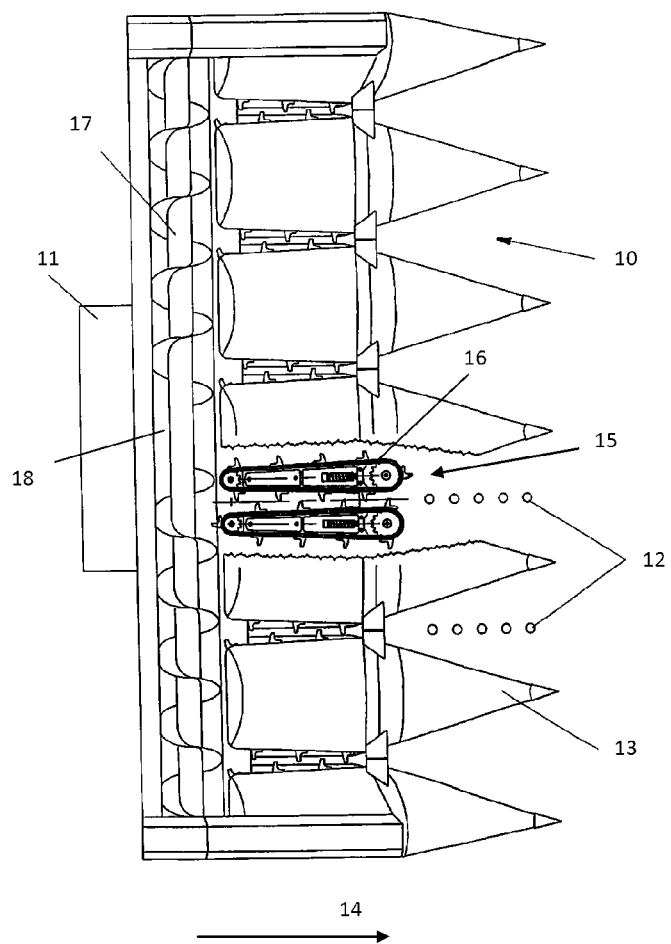
FIG. 1 is a schematic top view of a corn harvesting header according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

MODE(S) FOR CARRYING OUT THE INVENTION

The present invention is described herein below with respect to a corn harvester, having a corn harvesting header. This, however, is not intended to be limiting for the present invention. In its most general form, the present invention relates to a stalked crop harvester, and to a stalked crop harvesting header there for. Embodiments of the present invention also relate to a method for harvesting stalked crop material with a stalked crop harvester according to embodiments of the present invention. Corn is only one type of stalked crop material which is considered with respect to a harvesting method in accordance with embodiments of the present invention. In alternative embodiments, the present invention may for example relate to a sunflower harvester, and to a sunflower harvesting header there for.

The term "corn material" is used principally throughout this specification for convenience and it should be understood that this terms is not intended to be limiting. Thus "corn material" refers to that part of the corn stalk which is threshed and separated from the discardable part of the corn stalk. In particular, the term "corn material" may refer to corn ears or grain.

FIG. 1 shows a top view of a corn harvesting header 10 according to embodiments of the present invention, for use with a corn harvester. In use, the corn harvesting header 10 is attached to the front 11 of a corn harvester (not illustrated), at a suitable height above the soil. The corn harvesting header 10 may for example be attached to a corn harvester, for example a corn harvester which is otherwise conventional except for the corn harvesting header 10. The height of the corn harvesting header 10 may be adjustable depending on e.g. parameters of the crop material to be harvested, such as for example type of crop material, height, etc.

When the corn harvester moves through a field of corn stalks 12, several dividers 13, arranged in a row perpendicular to the longitudinal direction 14 of the corn harvester, guide the corn stalks 12 to header units 15. The longitudinal direction 14 of the corn harvester is the direction of travel thereof. An example header unit 15 is illustrated in more detail in FIG. 2. A header unit 15 comprises a cutting device, for example a pair of rotating snapping rollers as in U.S. Pat. No. 6,237,314 (not shown in the picture), to remove the corn material from the corn stalks 12, and conveyor chains 16 for transporting the harvested material in a direction opposite to the direction of travel of the harvester towards an auger 17. The auger 17 collects in a central gathering point 18 of the corn harvesting header 10 the corn material harvested at different header units 15 along the auger 17. From this central gathering point 18, the harvested material is rearwardly fed towards a temporary storage location of the corn harvester for storage and/or further treatment.

Figure 2:
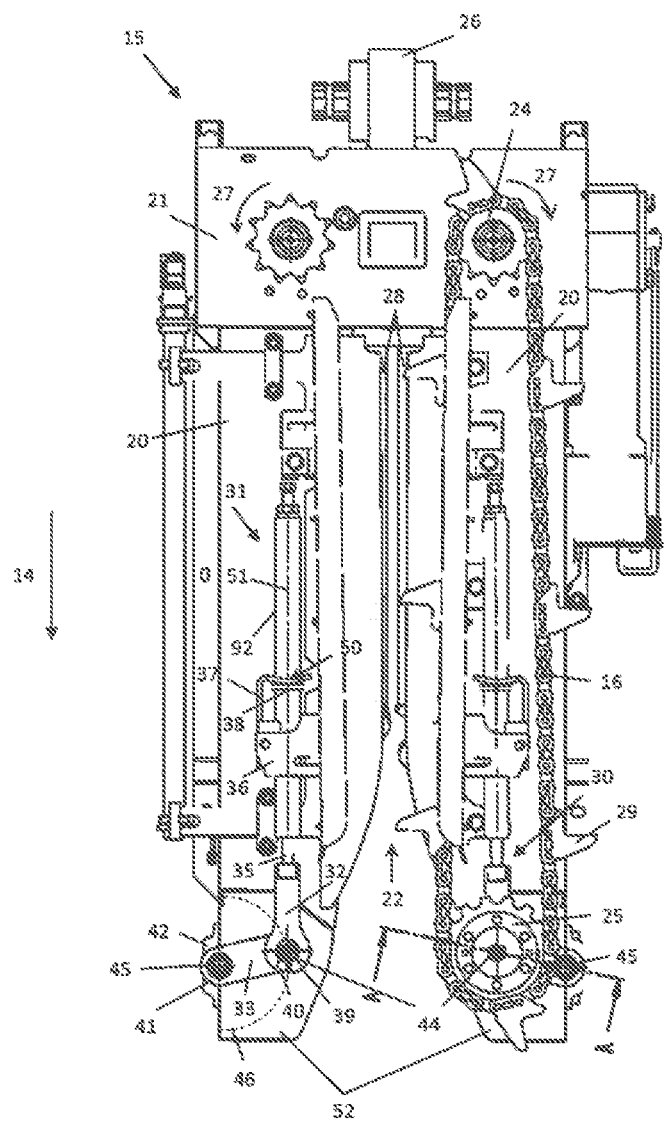
FIG. 2 is a schematic top view of a header unit and tensioning system in accordance with embodiments of the present invention, with some parts broken away in the left part of the figure for a better illustration of the parts.

FIG. 2 shows a more detailed view of an individual header unit 15 of a corn harvesting header 10 according to embodiments of the present invention. The header unit 15 illustrated comprises a pair of base plates 20, for example attached to a main supporting body 21 in such way that between them an opening groove 22 is provided, substantially parallel to the longitudinal direction 14 of the corn harvester. The base plates 20 may have a top surface, i.e. the surface facing the conveyor chains 16. The top surfaces of the base plates 20 may substantially be lying in a plane, further called the plane of the base plates 20. Supporting plates 52, which form part of or an extension of the base plates 20, extend on the side of the header unit 15 facing away from the main supporting body 21. The shape of the supporting plates 52 and the shape of the base plates 20 may be adapted such that the groove 22 of the header unit 15 has a larger width at the side for receiving and guiding the corn stalks 12, i.e. the side facing away from the main supporting body 21, and narrows towards the main supporting body 21. This narrowing of the groove 22 may be a continuous narrowing, or a step-wise narrowing, or a combined continuous and step-wise narrowing.

The header unit 15 furthermore comprises two drive sprocket 24/idler sprocket 25 assemblies arranged on the opposite sides of the groove 22. According to embodiments of the present invention, each drive sprocket/idler sprocket assembly comprises a drive sprocket 24 assembled on the main supporting body 21 and an idler sprocket 25 arranged on the supporting plate 52. The idler sprocket 25 and the drive sprocket 24 are arranged on the header unit 15 in such way that a conveyor chain 16, spanned over the sprockets 24 and 25, has its longitudinal direction substantially parallel to the groove 22 of the header unit 15. The drive sprockets 24 may be affixed to the main supporting body 21 in any suitable way, for example by bolting the drive sprockets 24 to the main supporting body 21. The sprockets 24 receive rotational power, for example from gearing 26 and rotate in a direction indicated by arrows 27. The two drive sprockets 24 of one header unit 15 rotate in different directions, such that the conveyor chains 16 driven by the drive sprockets 24 at the level of the groove 22 move in the same direction and can transport corn material towards the auger 17.

One or more cutting devices may be provided in the header unit 15, to remove the corn material from the corn stalks 12. As an example, underneath the base plates 20 and parallel to the groove 22, snapping rollers 28 such as described in U.S. Pat. No. 6,237,314 may be provided, which grip the corn stalks 12 and pull them downwardly while the corn material is removed. The removed corn material, forming the harvested material, is subsequently transported by means of the conveyor chains 16 along the groove 22 in a direction opposite to the direction of travel 14 of the harvester towards the rear side of the header unit 15. To support the working of the conveyor mechanism, propelling elements 29 may be discretely assembled on the conveyor chains 16 for transporting the harvested crop material. The propelling elements 29 from one chain of the header unit 15 may be arranged opposing to the propelling elements 29 of the other chain, or the propelling elements 29 may be alternatingly arranged on the first and the second chain 16.

Whereas the position of the drive sprockets 24 on the main supporting body 21 is fixed, movement of the idler sprockets 25 in a plane parallel to the plane of the supporting plates 52 of the header unit 15 is allowed by means of a tensioning system 30 according to embodiments of the present invention. Each idler sprocket 25 may have its own tensioning system 30. A tensioning system 30 according to embodiments of the present invention may comprise a spring system 31 for exerting a force on the idler sprocket 25 in a longitudinal direction 14 of the harvester. The spring system 31 may be placed along the groove 22 of the header unit 15. The tensioning system 30 may furthermore comprise a first tensioning arm 32 and a second tensioning arm 33, both being arranged rotationally with one another. The first tensioning arm 32 may be connected between the spring system 31 and the idler sprocket 25, whereas the second tensioning arm 33 may be arranged between the first tensioning arm 32 and a fixed point of the header unit 15. The spring system is adapted to exert a force on the idler sprocket 25 via the first tensioning arm 32.

Figure 3:
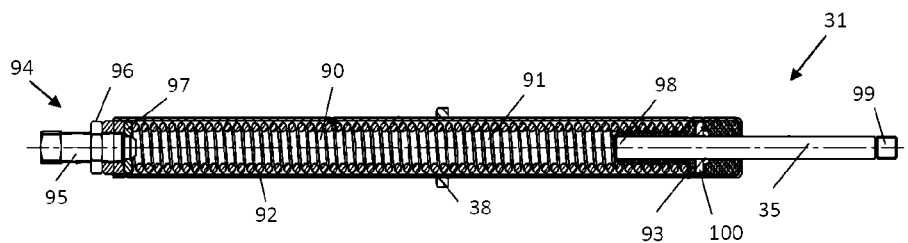
FIG. 3 is a cross-sectional 2D view illustrating a coil spring system according to embodiments of the present invention.

According to embodiments of the present invention, the spring system 31 may for example be a coil spring system, which may comprise a coil spring 90 and a rod member 35, the rod member 35 being connected to the first tensioning arm 32. The rod member 35 may for example be a cylindrical rod member. A longitudinal cross-sectional view of a coil spring system 31 according to embodiments of the present invention is illustrated in FIG. 3. The coil spring 90, for example a compression coil spring having a predetermined number of coaxial spring turns 91, may be covered by a cylindrical sleeve 92. The cylindrical sleeve 92 may have an inner diameter slightly larger than the outer diameter of the spring turns 91. The sleeve 92 may prevent dirt and corn waste becoming jammed between the turns 91 of the coil spring 90.

A first extremity 98 of the rod member 35 faces away from the idler sprocket 25, and a second extremity 99 of the rod member 35 faces the idler sprocket 25. The first extremity 98 of the rod member 35 is connected to the coil spring 91. This first extremity 98 may be covered by the sleeve 92, while the second extremity 99 may extend from the sleeve 92. The first extremity 98 may be movable in the cylindrical sleeve 92 under influence of the forces exerted between the coil spring and the first tensioning arm 32, the first tensioning arm 32 being connected to the second extremity 99 of the rod member 35.

The rod member 35 may be provided, at or in the neighborhood of its first extremity 98, with a collar 100 against which the coil spring pushes. Hence, the coil spring may exert a force on the rod member 35. If the collar 100 is not provided exactly at the end of the first extremity 98, the first extremity 98 of the rod member 35 may be fit at the inside of the spring turns 91. Optionally, the portion of the rod member 35 between the first extremity 98 and the collar 100 may be covered by a rod covering body 93. The rod covering body 93 may be a bushing, for example a plastic bushing, working as a guide. It may serve as a protection of the contact between rod member 25 and coil spring 90.

According to embodiments of the present invention, the distal end of the cylindrical sleeve 92 with respect to the idler sprocket 25 may furthermore comprise a bolt-nut assembly 94, comprising bolt 95 and nut 96. The bolt 95 may partially extend from the cylindrical sleeve 92, and may partially be enclosed by the cylindrical sleeve 92. The end of bolt 95 facing the idler sprocket 25 may be affixed to a cylindrical plate 97, which may for example have a diameter substantially equal to the outer diameter of the spring turns 91. Screwing the bolt 95 in a direction towards the idler sprocket 25 may cause the cylindrical plate 97 to apply a force on the coil spring 90 so as to adjust spring force if needed.

In alternative embodiments, rather than using a coil spring system, any other suitable spring system 31 which allows to execute a force on the idler sprocket 25 via the first tensioning arm 32 may be used. For example, the spring system 31 may comprise a gas spring, having a cylindrical main body and a rod member slideable into the cylindrical main body. The spring system 31 may be suspended above the base plate 20, for example by means of a holding frame 36, which comprises a bent suspension arm 37 with a recess 50 in or through which the cylindrical sleeve 92 passes. A local protrusion 38 is provided on the cylindrical sleeve 92 and prevents the cylindrical sleeve 92 to move towards the direction of the main supporting body 21 under influence of the forces between the spring system 31 on the idler sprocket 25. The local protrusion 38 may for example be one or more pins which prevent the cylindrical sleeve 92 to move through the recess 50. Alternatively, the local protrusion may for example be a ring having at least one dimension, e.g. a diameter, slightly larger than the corresponding dimension of the recess 50. Hence the forces exerted between the spring system 31 and the idler sprocket 25 will move the idler sprocket 25 so as to provide a suitable tension the conveyor chain 16.

The spring system 31 may be coupled to any suitable sensor system (not illustrated) for sensing the tension of the conveyor chain 16, and may be actuated based on a sensing signal from the sensor system.

The suspension arm 37 may be substantially L-shaped, with a first leg of the L-shape being placed in longitudinal direction of the spring system 31, and a second leg of the L-shape being placed substantially perpendicular to the longitudinal direction of the spring system 31. The part of the suspension arm 37 perpendicular to the longitudinal direction of the spring system 31, i.e. the second leg, may be slightly bent towards the local thickening 38 to allow a slight rotation of a central axis 51 of the spring system 31 in a plane parallel to the plane of the base plates 20.

The extremity of rod member 35 of the spring system 31 facing the idler sprocket 25 is connected to the first tensioning arm 32, which lies in a longitudinal direction of the spring system 31 and has a distal end 39 with respect to the spring system 31. The second tensioning arm 33 of the tensioning system 30 has a first extremity 40 with an axis passing, for example an axis substantially perpendicular to the plane of the base plate 20, through the distal end 39 of the first tensioning arm 32. The second tensioning arm 33 also has a second extremity 41 rotatably connected to the header unit 15, e.g. to a supporting plate 52 thereof, for example via arm support 42, as will be described in more detail below. According to embodiments of the present invention, the distal end 39 of the first tensioning arm 32 and the first extremity 40 of the second tensioning arm 33 are rotatably connected to one another. This rotatable connection may for example include a rotation around an axis substantially perpendicular to the plane of the base plate 20, for example around the axis of the idler sprocket 25. The rotatable connection may for example be achieved by assembling a shaft 44 on the first extremity 40 of the second tensioning arm 33 around which the first tensioning arm 32 can rotate. Alternatively (not illustrated), the rotatable connection may for example be achieved by assembling a shaft on the distal end 39 of the first tensioning arm 32 around which the second tensioning arm 33 can rotate, for example by fitting the shaft in a corresponding hole in the second tensioning arm 33.

Figure 4:
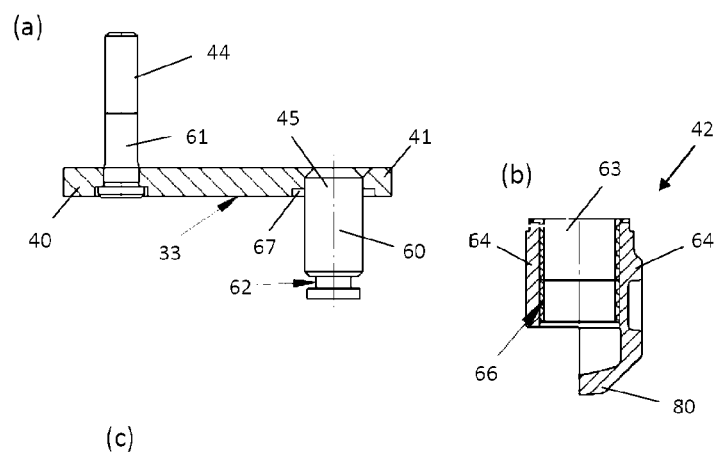
FIG. 4 is a cross-sectional view illustrating the assembling of the second tensioning arm (FIG. 4($a$)) with the arm support (FIG. 4($b$)). The assembly according to embodiments of the present invention is illustrated in FIG. 4($c$).

FIG. 4 is a detailed cross-sectional view illustrating different elements of a tensioning system 30 according to embodiments of the present invention. A first shaft 44 is mounted on the second tensioning arm 33, as illustrated in FIG. 4(a). The first shaft 44 is assembled on the first extremity 40 of the second tensioning arm 33 and in use on the header unit 15 extends upwardly from the second tensioning arm 33. The second extremity 41 of the second tensioning arm 33 is provided with a second shaft 45, having a longitudinal axis 60 parallel to the longitudinal axis 61 of the first shaft 44 and, in use on the header unit 15, extending downwardly from the second tensioning arm 33. At its distal end with respect to the tensioning arm 33, the second shaft 45 has a groove 62 around the circumference of the shaft. As illustrated in FIG. 4(c), the second shaft 45 is rotatably mounted into a bore 63 in the arm support 42, shown in FIG. 4(b), wherein the bore 63 is delimited in radial direction by a sidewall 64. A bushing 66 is provided between the inner wall of the bore 63 and the outer wall of the second shaft 45. The upper portion of the sidewall 64 of the arm support 42 is retained in a circular groove 67 in the bottom side of the second tensioning arm 33 adjacent to the second shaft 45. The sidewall 64 of the arm support 42, at its side away from the first extremity of the second tensioning arm 33, has an extension 80 which covers the groove 62 of the second shaft 45, whereas at the other side the sidewall 64 may leave the groove 62 uncovered. As illustrated in cross-section in FIG. 5, the arm support 42 is assembled on the supporting plate 52 of the header unit 15 in such way that the second shaft 45 has its longitudinal axis 60 substantially perpendicular to an upper surface 68 of the supporting plate 52. Moreover, a spacing 47 between the second tensioning arm 33 and the upper surface 68 of the supporting plate 52 is provided, such that friction between the tensioning system 30 and the supporting plate 52 is avoided.

Figure 6:
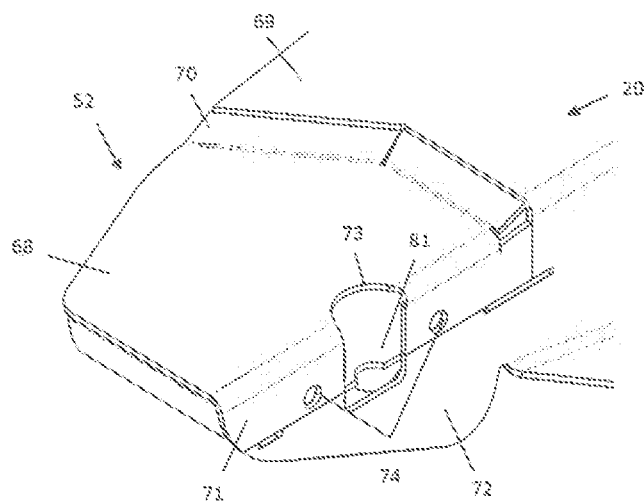
FIG. 6 is a 3D view illustrating the supporting plate before the tensioning system according to embodiments of the present invention is mounted.

A 3D view of a supporting plate 52 in accordance with embodiments of the present invention is shown in FIG. 6. The supporting plate 52 comprises an upper surface 68 substantially parallel with the upper surface 69 of the base plate 20. The supporting plate 52 may also comprise a transition region 70 between the upper surface 69 of the base plate 20 and the upper surface 68 of the supporting plate 52. Furthermore, the supporting plate 52 may comprise a side plate 71 bent substantially 90° from the upper surface 68 and for example lying in a same plane as a side plate 72 of the base plate 20. In use, the upper surface 68 of the supporting plate 52 may ly in a lower plane with respect to the upper surface 69 of the base plate 20, whereby the difference in height between the upper surfaces 68 and 69 is determined by the slope of the transition region 70. This height difference may be provided for accommodating the second tensioning arm 33. If no height difference is provided between the upper surface 68 of the supporting plate 52 and the upper surface 69 of the base plate 20, either the tensioning system 30 can be place higher with respect to the upper surface 69 of the base plate 20, or first extremity 40 of the second tensioning arm 33 can be placed above the distal end 39 of the first tensioning arm 32.

Figure 7:
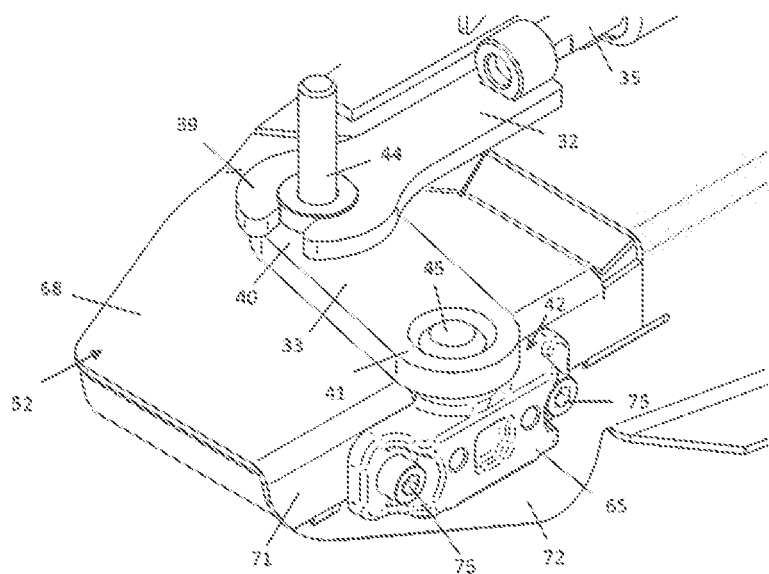
FIG. 7 is a 3D view illustrating the supporting plate after the tensioning system according to embodiments of the present invention is mounted.

A recess 73 may be provided in the upper surface 68 and the side plate 71, for example a recess 73 which shows a mating fit with the arm support 42, and which may be intended for receiving the first sidewall 64 of the arm support 42. The side plate 71 may furthermore comprise holes 74, for example two holes, which may be threaded holes, which may be symmetrically arranged next to recess 73, for bolting the arm support 42 to the supporting plate 52. A 3D view of the arm support 42, bolted to the side plate 71 of the supporting plate 52 using bolts 75, is illustrated in FIG. 7. The supporting plate 52 may furthermore comprise a reinforcement plate 81, located underneath and for example substantially parallel to the upper surface 68, with a thickness chosen such that the outer edge of the reinforcement plate 81 facing the arm support 42 fits into the groove 62 of the second shaft 45. The reinforcement plate 81 may protect the second shaft 45 from movement in axial direction.

Figure 5:
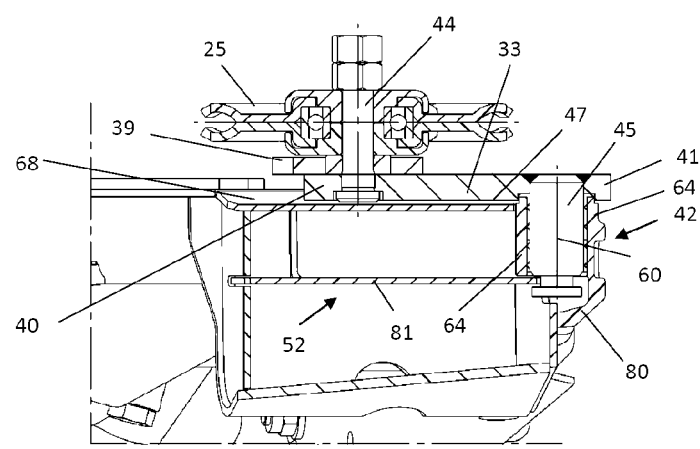
FIG. 5 is a cross-sectional view of the tensioning system according to embodiments of the present invention, taken along section A-A in FIG. 2.

Furthermore, referring to FIGS. 2, 5 and 7, in embodiments of the present invention the first shaft 44 mounted on the second tensioning arm 33 is at least partially enclosed by the distal end 39 of the first tensioning arm 32, so that the first tensioning arm 32 and the second tensioning arm 33 are rotatably connected to one another. The idler sprocket 25, not shown in FIG. 7, is attached onto the shaft 44 and centered with respect to the axis through the distal end 39 of the first tensioning arm 32. The thickness of the tensioning arms 32 and 33, the slope of the transition region 70 and the spacing 47 between the second tensioning arm 33 and the upper surface 68 of the supporting plate 52 are chosen such that the idler sprocket 25 and the drive sprocket 24 lie in a plane parallel to the plane of the base plates 20.

The second shaft 45 allows a rotation of the second tensioning arm 33 in a plane parallel to the plane of the supporting plates 52. This second shaft 45 may for example be assembled on the opposite side of the supporting plate 52 with respect to the groove 22, so as not to obstruct the groove for receiving stalked crop material. As illustrated in FIG. 2, the rotation of the second tensioning arm 33 around the second shaft 45 induces a change in position of the idler sprocket 25 along a circular path indicated with dashed line 46. By means of this rotational movement in a plane parallel to the plane of the base plates 20, the axial spacing between the idler sprocket 25 and the drive sprocket 24 can be increased or decreased, thus allowing for an optimization of the tension in the conveyor chain 16 regulated by the spring system 31.

Before operation of the corn harvester, the tensioning system 30 may be arranged such that the rod member 35 is partially pushed into the cylindrical sleeve 92 by a compression of the spring, e.g. coil spring 90 or gas spring. When the conveyor chain 16 undergoes wear-related stretching during a sequence of conveying cycles, the spring, e.g. coil spring 90 or gas spring, will extend and apply a force on the rod member 35, e.g. via collar 100. Hence, the rod member 35 of the spring system 31 will slide out of the cylindrical sleeve 92, moving the first tensioning arm 32 towards the front of the header unit 15, which in turn will induce a rotation of the second tensioning arm 33 around the vertical axis of the second shaft 45. As a result, the centre of the idler sprocket 25, mounted onto the first shaft 44 of the tensioning system 30, will travel along the circular path 46 away from the idler sprocket 24 until the chain tension is restored. In the inverse case, when the tension in the conveyor chain 16 is too high, the rod member 35 of the spring system 31 will be pushed back into the cylindrical sleeve 92 by a compression of the spring, e.g. coil spring 90 or gas spring, and the centre of the idler sprocket 25 will travel along the circular path 46 towards the idler sprocket 24.

It is an advantage of a tensioning system 30 according to embodiments of the present invention that a spring system 31, for example a coil spring system, may be provided which allows to maintain the chain tension during the entire lifetime of the conveyor chain 16. It is an advantage of a tensioning system 30 according to embodiments of the present invention that during tough harvesting conditions, for example when the density of crop material to be harvested is considerably large, the force generated by the spring system 31 may be increased by adjustment of the bolt-nut system 94 of the spring system 31. By screwing bolt 95 in a direction towards the idler sprocket 25, the cylindrical plate 97 will compress the coil spring 90, resulting in an increase of the maximum force which can be executed by the coil spring 90 on the rod member 35. By unscrewing bolt 95 in a direction away from the idler sprocket 25, the maximum force that can be executed by the coil spring 90 on the rod member 35 is reduced.

In a particular embodiment of a tensioning system 30 according to embodiments of the present invention, the tensioning system 30 may be furthermore arranged such that the angle between the first tensioning arm 32 and the second tensioning arm 33 is approximately 90°. For example, the angle between the first tensioning arm 32 and the second tensioning arm 33 may take during the complete tensioning process a value in a range from 70° to 110°, for example from 80° to 100°, such as between 85° and 95°, such that the first tensioning arm 32 is substantially parallel to the opening groove 22 and the second tensioning arm 33 is substantially perpendicular to the opening groove 22. Using this particular configuration, as also illustrated in FIG. 2, the idler sprocket 25 will travel in a direction almost parallel to the opening groove 22 to adjust the tension in conveyor chain 16. As a result, during operation of the stalked crop harvester, the longitudinal direction of the conveyor chain 16 will remain nearly parallel to the opening groove 22, so that optimal conveyor conditions are maintained. Moreover, using the particular embodiment of a tensioning system 30 according to the present invention, the dimension of the base plate 20 in a direction perpendicular to the opening groove 22 can be limited, and a compact header unit 15 may be obtained. It is an advantage of a stalked crop harvesting header, e.g. corn harvesting header 10, according to embodiments of the present invention that tension in the conveyor chains 16 is maintained by a rotational movement of the idler sprockets 25, taking away the need to provide means for limiting movement of the idler sprockets 25 in a direction perpendicular to the direction of travel 14. This way, a compact solution (in a direction perpendicular to the direction of travel 14) may be obtained. It is an advantage of using a tensioning system 30 according to embodiments of the present invention that guide elements such as for example groove-shaped recesses are not required for a linear guidance of the idler sprockets 25. These two advantage each separately and together limit the risk of dirt or crop waste becoming jammed in the chain tensioning system 30. When during operation of the stalked crop harvester according to embodiments of the present invention dirt is accumulated in the spacing 47 between the tensioning arms and the supporting plate 52, it will be pushed away by the rotational movement of the idler sprocket 25, thus avoiding both blockage of the tensioning system 30 and rust formation during inactivity of the stalked crop harvester.

While the invention has been illustrated and described in detail in the drawings and foregoing description, such illustration and description are to be considered illustrative or exemplary and not restrictive. The invention is not limited to the disclosed embodiments.

The foregoing description details particular embodiments of the invention. It will be appreciated, however, that no matter how detailed the foregoing appears in text, the invention may be practiced in many ways. It should be noted that the use of particular terminology when describing particular features or aspects of the invention should not be taken to imply that the terminology is being re-defined herein to be restricted to include any specific characteristics of the features or aspects of the invention with which that terminology is associated.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The invention claimed is:

1. A stalked crop harvesting header for a harvester, the harvesting header comprising
a frame having at least one groove for receiving stalked crop material;
a conveyor system connected to the frame adjacent the groove and having a chain for conveying harvested stalked crop material, the chain being driven around two sprockets, and a tensioning system for tensioning the chain of the conveyor system,
the tensioning system comprising a spring system coupled to a first tensioning arm and arranged for applying a force on the first tensioning arm, the first tensioning arm and a second tensioning arm rotatably connected to one another around a shaft on which one of the sprockets is mounted such that the first tensioning arm is rotatable with respect to the second tensioning arm, and the second tensioning arm being rotatably connected to a fixed point on the frame of the stalked crop harvesting header.

2. A stalked crop harvesting header according to claim 1, wherein the shaft is provided on the first tensioning arm such that the second tensioning arm can rotate around the shaft with respect to the first tensioning arm or on the second tensioning arm such that the first tensioning arm can rotate around the shaft with respect to the first tensioning arm.

3. A stalked crop harvesting header according to claim 1, wherein the angle between the first tensioning arm and the second tensioning arm during the tensioning process is a value in a range between 80° and 100°.

4. A stalked crop harvesting header according to claim 1, wherein the second tensioning arm is placed substantially perpendicularly to a central axis of the spring system.

5. A stalked crop harvesting header according to claim 1, further comprising a supporting plate having an upper surface, wherein the tensioning system is arranged in a plane parallel to the upper surface of the supporting plate such that a spacing is provided between the upper surface and the tensioning system.

6. A stalked crop harvesting header according to claim 1, wherein the spring system comprises a coil spring and a rod member, the rod member being connected to the first tensioning arm.

7. A method for harvesting stalked crop material with a stalked crop harvesting header, the method comprising
moving a stalked crop harvesting header through a field of crop stalks for receiving crop stalks within at least opening of a frame of the header,
conveying harvested crop stalks with a first and second chain conveyor located on opposite sides of the opening, at least one of the first and second chain conveyor extending over at least two sprockets,
maintaining the tension in the chain conveyor between the at least two sprockets with a tensioning system by adjusting the axle spacing between the two sprockets by changing the position of one of the sprockets by a rotational movement of the axis of that sprocket around a fixed point on the crop harvesting header, wherein the position of the axis of the sprocket is changed by altering a force applied an actuating member against a first tension arm mechanism such that the first tensioning arm is rotated with respect to the second tensioning arm moving the position of the sprocket, wherein the second tensioning arm being rotatable connected to a fixed point on the frame of the stalked crop harvesting header.

8. A tensioning system for a crop harvesting mechanism for adjusting the tension of a chain conveyor adapted for being driven around two sprockets, the tensioning system comprising
a first tensioning arm and a second tensioning arm rotatably connected to one another for rotation around a shaft onto which one of the sprockets is mounted such that the first tensioning arm is rotatable with respect to the second tensioning arm, the second tensioning arm rotatably connected to a fixed point of a supporting plate, the tensioning system furthermore comprising a spring system arranged for applying a force on the first tensioning arm.

9. Tensioning system according to claim 8, wherein the shaft is mounted on the first tensioning arm allowing the second tensioning arm to rotate around the shaft or on the second tensioning arm such that the first tensioning arm can rotate around the shaft.

10. Tensioning system according to claim 8, wherein the first tensioning arm is lying in a longitudinal direction of the spring system.

11. Tensioning system according to claim 8, wherein the spring system comprises a coil spring and a rod member, the rod member connected to the first tensioning arm.

12. Tensioning system according to claim 11, wherein the coil spring is covered by a cylindrical sleeve.

13. Tensioning system according to claim 8, wherein the angle between the first tension arm and the second tensioning arm is between 70° and 110°.

14. The tensioning system of claim 8 in combination with a stalked crop harvester wherein the chain conveyer is configured and positioned on the header for conveying harvested stalk crop material.

15. A stalked crop harvesting header according to claim 1, wherein the first tensioning arm is connected between the spring system and the sprocket and the second tensioning arm is arranged between the first tensioning arm and the fixed point of the header unit such that the spring system exerts a force on the sprocket through the first tensioning arm.

16. The tensioning system according to claim 8, wherein the first tensioning arm is connected between the spring system and the sprocket and the second tensioning arm is arranged between the first tensioning arm and the fixed point of the header unit such that the spring system exerts a force on the sprocket through the first tensioning arm.

\* \* \* \* \*